(12) United States Patent
Choi et al.

(10) Patent No.: US 6,754,199 B1
(45) Date of Patent: Jun. 22, 2004

(54) TRUNK ROUTING DEVICE AND METHOD FOR CDMA SYSTEM

(75) Inventors: Young Joon Choi, Seoul (KR); Heon Yong Shim, Seoul (KR)

(73) Assignee: Hyundai Electronics Ind. Co. Ltd., Kyungki-Do (KR)

( * ) Notice: Subject to any disclaimer, the term of this patent is extended or adjusted under 35 U.S.C. 154(b) by 703 days.

(21) Appl. No.: 09/669,929

(22) Filed: Sep. 26, 2000

(30) Foreign Application Priority Data

Oct. 5, 1999 (KR) ........................................ 1999-42861

(51) Int. Cl.[7] .............................................. H04B 7/216
(52) U.S. Cl. ..................................... 370/342; 370/349
(58) Field of Search ................................. 370/327, 335, 370/389, 392, 340, 342, 394, 441, 349; 455/520, 561

(56) References Cited

U.S. PATENT DOCUMENTS

| | | | |
|---|---|---|---|
| 4,494,230 A | | 1/1985 | Turner |
| 4,561,090 A | | 12/1985 | Turner |
| 5,878,038 A | * | 3/1999 | Willey ........................ 370/335 |
| 6,016,310 A | | 1/2000 | Muller et al. |
| 6,370,127 B1 | * | 4/2002 | Daraiseh et al. ............ 370/328 |
| 6,507,587 B1 | * | 1/2003 | Bahl ........................... 370/443 |
| 6,577,878 B1 | * | 6/2003 | Park et al. .................. 455/561 |

* cited by examiner

Primary Examiner—Alpus H. Hsu
Assistant Examiner—Toan D. Nguyen
(74) Attorney, Agent, or Firm—Merchant & Gould P.C.

(57) ABSTRACT

The trunk routing device and method in a CDMA mobile communication system according to the present invention is contrived to assign and establish a plurality of trunks in the unit of packet to send packet data between a base station controller and a base transceiver station in order to uniformly utilize all trunk paths. Once receiving a new packet from a node connected to the base station controller, the invention extracts information about the packet designation from every packet and switches the packet data with the trunks connected to the designation in the unit of packet, thus sending the packet date to the base transceiver station. Also, the present invention sequentially checks the status of the respective FIFO's connected the trunks for buffering the packet received via the trunks, and sequentially reads out the packet from the respective FIFO's in the unit of packet while the respective FIFO's are empty, according to the result of the checking step, multiplying the packet, to send the multiplied packet to a node connected to the base station controller, thereby uniformly using all packet transfer paths between the base station controller and the base transceiver station.

7 Claims, 8 Drawing Sheets

TRUNK ROUTING DEVICE AND METHOD FOR CDMA SYSTEM

BACKGROUND OF THE INVENTION

1. Field of the Invention

The present invention relates to packet data transmission between a base station controller (BSC) and a base transceiver station (BTS) for a code division multiple access (CDMA) system such as cellular mobile telephone system, personal communication service (PCS) and wireless local loop (WLL) system and, more particularly, to a trunk routing device and method for a CDMA system which automatically assigns and establishes a trunk path for sending packet data between the BSC and the BTS using a trunk router.

2. Description of the Related Art

Generally, the CDMA system has E1/T1 type trunks connecting the BSC and the BTS and includes a plurality of paths for sending a packet between the BSC and the BTS.

As the individual trunks are connected to nodes in a one-to-one basis, the BSC or BTS has to assign paths available among numerous transfer paths for every packet in order to establish a path for sending the packet between the BSC and the BTS. That is, the BSC or BTS is needed to add a desired trunk ID to a specific field to assign and establish a packet transfer path for every packet. Thus the packet is transferred only via trunk paths.

In such a system, the BSC or BTS uses statistical values measured for the utilization status or utilization ratio of the trunks between them in assigning and establishing a trunk path for sending a packet, thus relying on the statistic values and causing a bias of the packet transfer path. This results in overload on a specific trunk path.

Also, the system is required to have the nodes unnecessarily as many as the trunks, because the individual trunks are connected to the nodes in a one-to-one basis.

Furthermore, there are some cases where all packets using the corresponding trunks are missing while replacing a trunk cable between the BSC and the BTS.

SUMMARY OF THE INVENTION

It is, therefore, an object of the present invention to provide a trunk routing device and method for a CDMA system, which is contrived to implement a trunk router that automatically assigns and establishes a trunk path for sending a packet between the BSC and the BTS, i.e., automatically performing a routing between one node and a plurality of trunks in the unit of packet, with a consequence of sequential and uniform routing of all transfer paths and thereby enhancing the efficiency of the transfer paths.

It is another object of the present invention to provide a trunk routing device and method for a CDMA system, which is contrived to have a trunk router for performing a routing between one node and a plurality of trunks in the unit of packet, thus reducing the number of required nodes.

Specifically, the ultimate objective of the present invention is to provide a trunk routing device and method for a CDMA system designed to store information about trunk connection between the BSC and the BTS and the initial position of a router switch at the current path, detect a base station ID of the designation address from a packet received from the BSC via one node, and sequentially switching the position of the router switch at the current path to the trunk connected to the base station ID for sending the packet, thus uniformly utilizing all transfer paths connected to the designation address of the packet to increase the utility efficiency of trunks and, during replacement of a trunk cable, causing a loss of only one packet without affecting the entire transmission of packet data.

To achieve the above object of the present invention, there is provided a trunk routing device for a CDMA system, which assigns and establishes a path for sending a packet via a trunk between a base station controller and a base transceiver station, the trunk routing device including: a router transmit block for storing information about trunk connection between the base station controller and the base transceiver station and information about the initial position of a current router switch, and sequentially switching packets, received from one node connected to the base station controller, to the respective trunks linked to the destinations of the individual packets in the unit of packet; and a router receive block for sequentially multiplying the packets received from the base transceiver station via the trunks and sending the multiplied packets to the node.

In another aspect of the present invention, there is provided a trunk routing method, which is to send a packet received from a base station controller to a base transceiver station via a plurality of trunks, the trunk routing method including the steps of: storing information about trunk connection between the base station controller and the base transceiver station and information about the initial packet transfer path position, for initialization; receiving a new packet from one node connected to the base station controller and detecting a destination address from the packet; and sequentially checking a plurality of trunks at the current position of a router switch, switching the position of the router switch to the next trunk connected to the detected destination address, and sending the packet to the base transceiver station via the trunk.

In further another aspect of the present invention, there is provided a trunk routing method, which is to send a packet received from a base transceiver station to a base station controller via a plurality of trunks, the trunk routing method including the steps of: sequentially checking the status of the respective FIFO's connected to the respective trunks for buffering the packet received from the base transceiver station via the trunks; and sequentially reading out the packet from the respective FIFO's in the unit of packet while the respective FIFO's are empty, according to the result of the checking step, multiplying the packet and sending the multiplied packet to a node connected to the base station controller.

DETAILED DESCRIPTION OF THE PREFERRED EMBODIMENTS

Hereinafter, preferred embodiments of a trunk routing device and method for a CDMA system according to the present invention will be described in detail with reference to the accompanying drawings.

Figure 1:
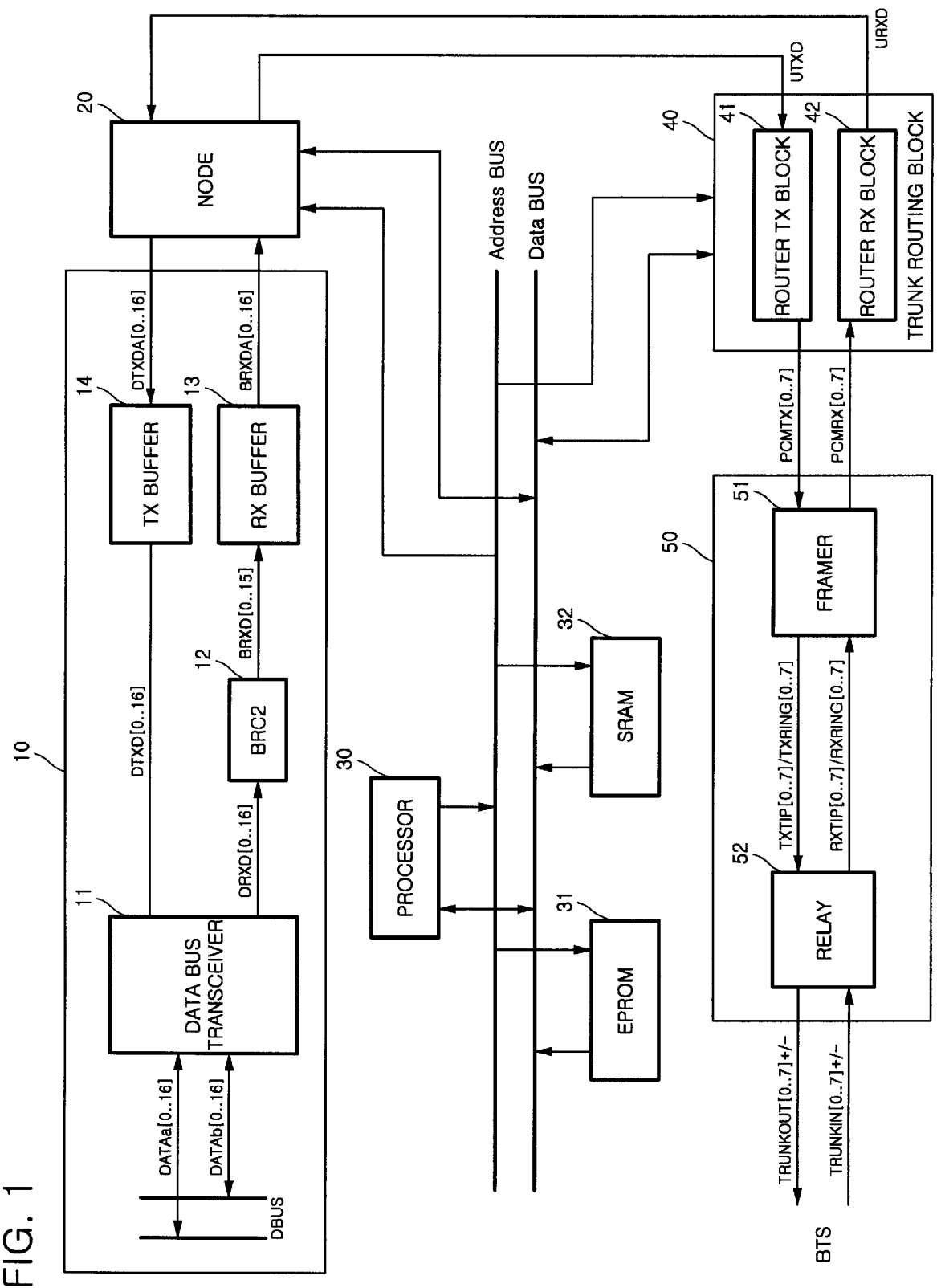
FIG. 1 is a schematic block diagram showing a trunk routing device for a CDMA system according to the present invention.

FIG. 1 is a schematic block diagram of the trunk routing device for the CDMA system according to the present invention.

As illustrated, a node transceiver 10 transmits a packet to a BSC via a node 20 and receives a packet from the BSC, sending the received packets to the node 20. The node transceiver 10 comprises: a data bus transceiver 11 for communicating the packet with the BSC via a data bus DBUS; a receive buffer 13 for buffering a signal received from the data bus transceiver 11; and a transmit buffer 14 for buffering a signal received from the node 20.

The node 20 sends a packet received from the node transceiver 10 to a trunk routing block 40 and a packet received from the trunk routing block 40 to the node transceiver 10.

A processor 30 controls the trunk routing such that the packets received at the node 20 are sent to trunks connected to the destinations of them in the unit of packet.

The trunk routing block 40 comprises: a router transmit block 41 for storing information about trunk connection between the BSC and the BTS and the initial position of a current router path switch and sequentially switching the packet received from the node 20 to the trunks connected to the destination of the packet in the unit of packet under the control of the processor 30; and a router receive block 42 for sequentially multiplying the packet received from the BTS via the respective trunks.

A trunk transceiver 50 comprises: a framer 51 for converting the packet routed with the respective trunks at the trunk routing block 40 to frames; and a relay 52 for relaying the signal passed through the framer 51 and communicating the signal with the BTS.

Now, a description will be give to the packet transmission from the BSC to the BTS with the trunk routing device as follows.

Figure 2:
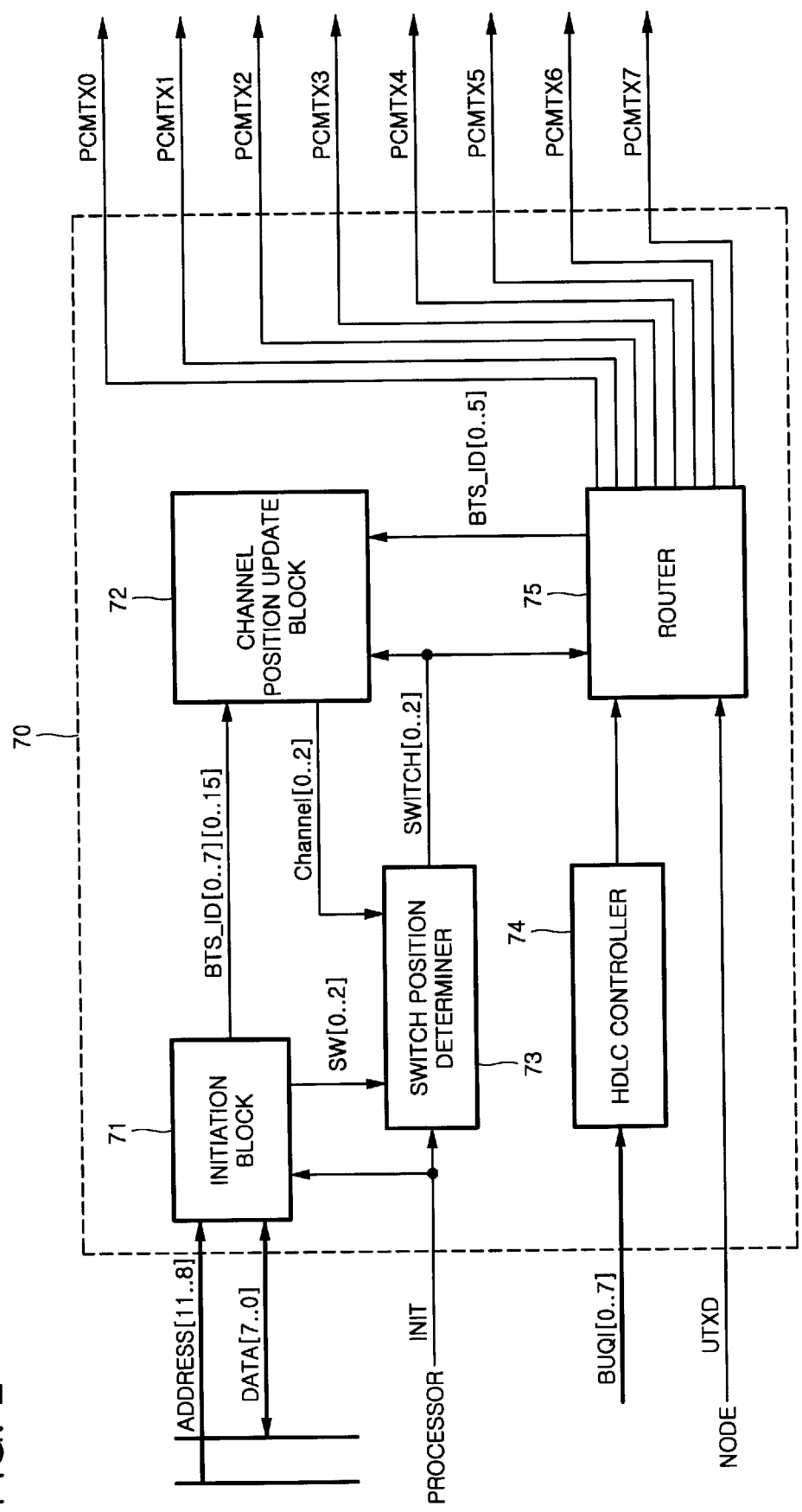
FIG. 2 is a schematic block diagram showing an embodiment of a trunk router transmit block according to the present invention.

The BSC, in this case, transmits the packet to the BTS via the router transmit block 41 of the trunk routing block 40. A schematic block diagram of the router transmit block 41 is presented in FIG. 2.

The router transmit block 41 comprises: an initializing block 71, a channel position updating block 72, a switch position determiner 73, a high-level data link control (HDLC) controller 74, and a router 75.

The initializing block 71 stores information about the trunk connection between the BSC and the BTS and the initial position of a packet transfer path received from the processor 30. The channel position updating block 72 updates the position of a channel in the unit of packet based on the trunk connection information and the initial packet transfer path position information from the initializing block 71, and the BTS ID information detected at the router 75.

The switch position determiner 73 selects the initial packet transfer path position information from the initializing block 71 and the channel position information from the channel position updating block 72 to determine the switch position, under the control of the processor 30.

The HDLC controller 74 detects the start and end flags of the packet based on the packet start/end flag signal fixedly implemented with hardware.

The router 75 detects the BTS ID from the packet output from the node 20 with reference to the detection signals of the HDLC controller 74 and routs the packet transferred from the node 20 according to the trunk connection information stored in the initializing block 71 and the current switch position information output from the switch position determiner 73.

Figure 3:
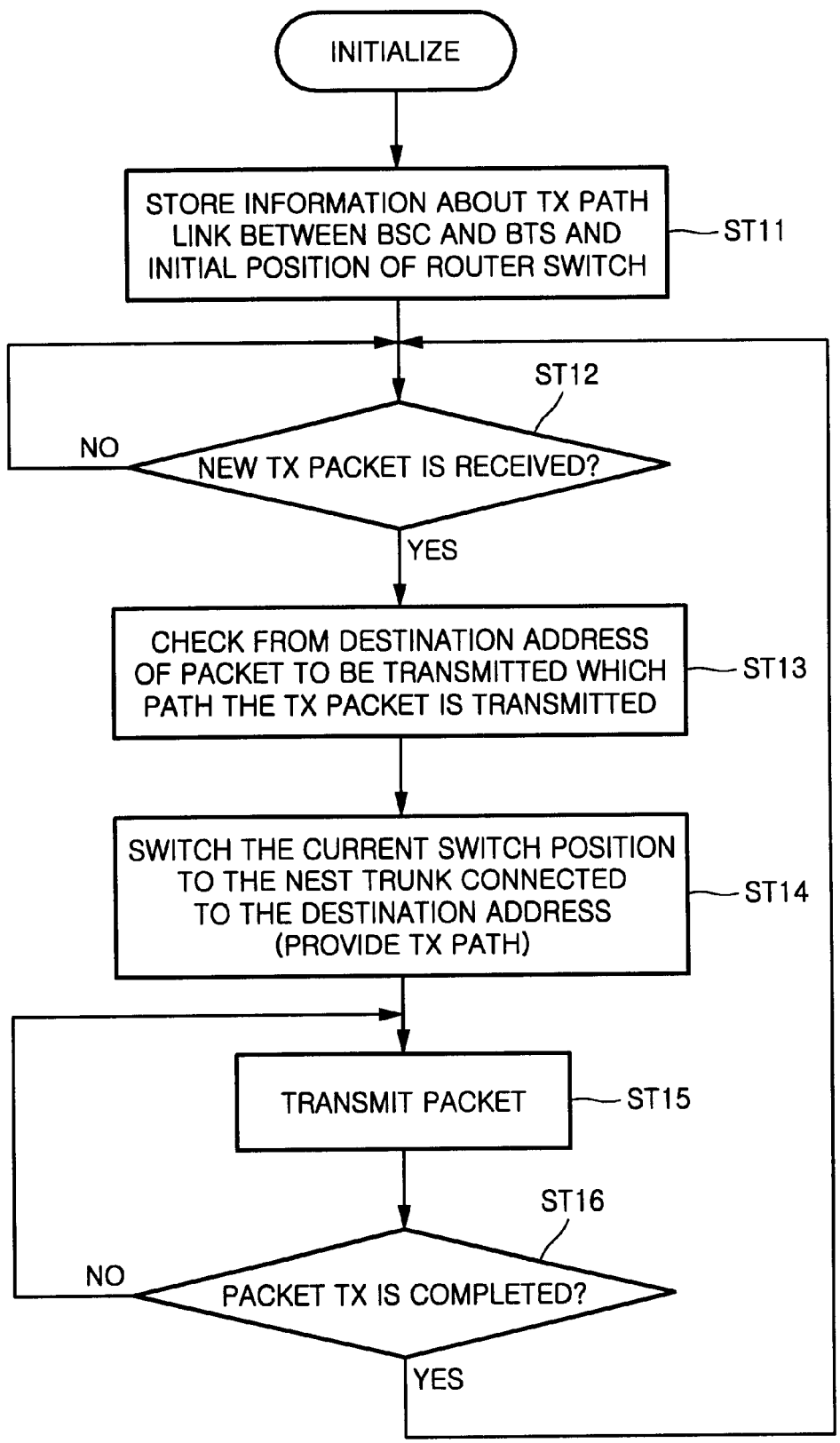
FIG. 3 is a flow chart showing a trunk routing method in sending a packet from a BSC to a BTS.

A trunk routing method of the router transmit block 41 is illustrated in FIG. 3.

As illustrated, the router transmit block 41 stores the trunk connection information and the initial packet transfer path position information received from the processor 30 (in ST11). Upon receiving a new packet from the node 20, the router transmit block 41 detects a destination address from the packet (in ST12 and ST13). The router transmit block 41 sequentially checks a plurality of trunks from the current switch position, switches the switch position to the next trunk connected to the destination address, and transmits the packet to the destination via the trunk (in ST14–ST16).

A description will now be given to a packet transmission method from the BSC to the BTS based on the trunk routing method of the router transmit 41.

First, the processor 30 sends the BSC-BTS trunk connection information BTS_ID0[0..5]—BTS_ID7[0..5] and the initial packet transfer path position information SW[0..2] to the initializing block 71, which stores the information (in ST11).

Once the packet transferred from the BSC is input to the trunk routing block 40 via the node transceiver 10 and the node 20 in sequence, the HDLC controller 74 of the router transmit block 41 detects a new packet input to the router transmit block 41, and the router 75 extracts a base station ID from the destination address field of the packet (in ST12 and ST13).

The router 75 then sends the base station ID to the channel position updating block 72.

Meanwhile, the channel position updating block 72 sequentially checks a plurality of trunks from the current position of a router switch (provided in the router 75 and not shown in FIG. 2) using the BSC-BTS trunk connection information and the initial packet transfer path position information received from the initializing block 71.

Upon receiving the information about the destination address of the input packet from the router 75, the channel position updating block 72 updates the channel position from the current position of the router switch to the next trunk connected to the destination.

The switch position determiner 73 determines the position of the router switch with the updated trunk and the router 75 switches the router switch based on the position of the switch, thus sending the packet via the trunk (in ST14 and STI5).

After completion of the transmission of one packet, the node 20 sends the next packet to the router transmit block 41 (in ST12) and the router transmit block 41 detects the base station ID at the destination address from the packet.

Thus the router switch is switched from the current position to the next trunk connected to the BTS, allowing transmission of the input packet to the destination.

In such a way, the trunk routing device detects the base station ID from the destination address of every packet received via one node 20 and sequentially switches the current position of the router switch to the trunks connected to that base station ID, thus transmitting the packets to the BTS. This allows uniform use of all transfer paths linked to the destination address.

A trunk routing method for sending a packet from the BTS to the BSC will now be described as follows.

Once receiving frames from the BTS via a plurality of trunks, the framer 51 of the trunk transceiver 50 converts the frames to packets and sends the packets to the trunk routing block 40.

Now, a detailed description will be given to the router receive block 42 of the trunk routing block 40.

Figure 4:
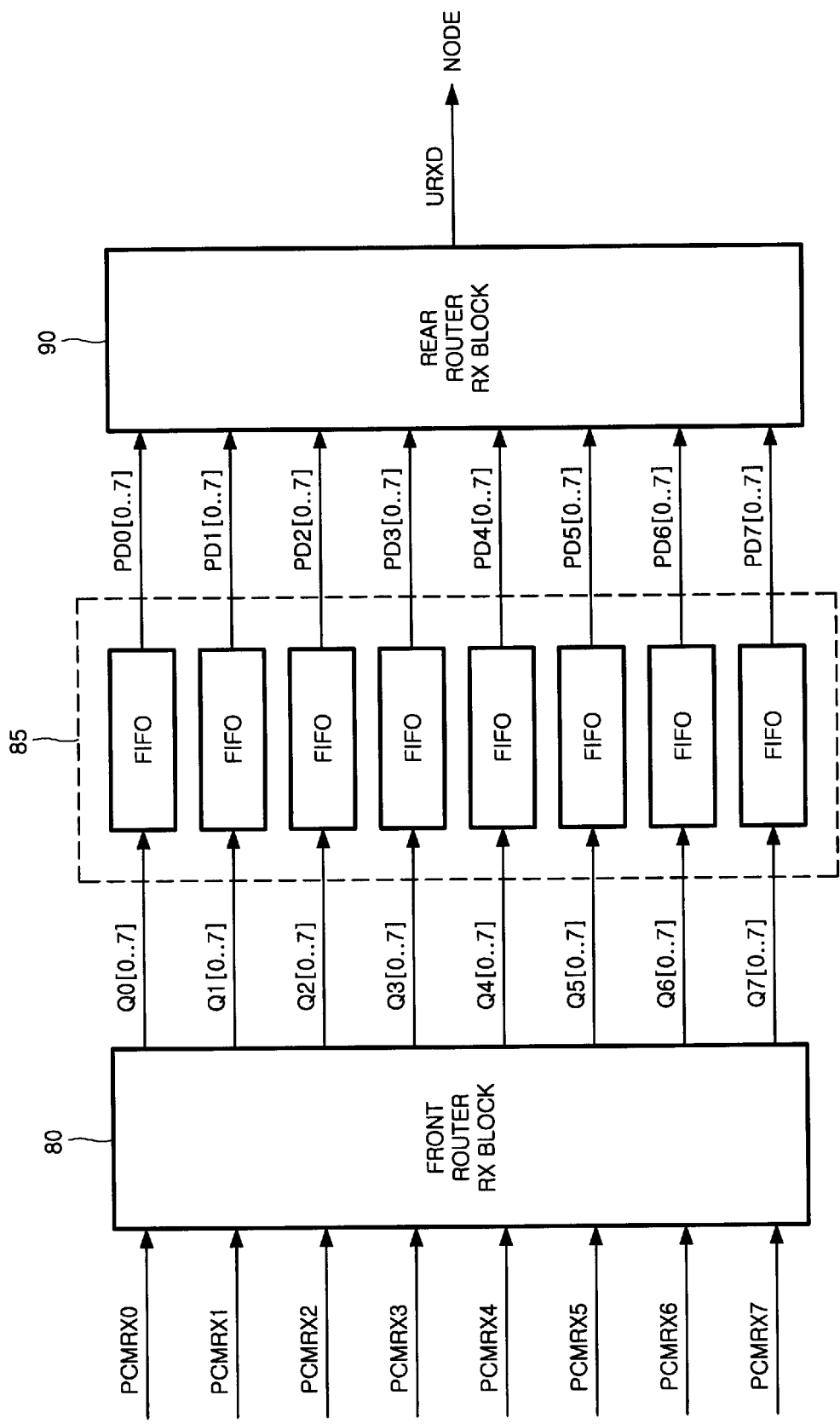
FIG. 4 is a schematic block diagram showing an embodiment of a trunk router receive block according to the present invention.

FIG. 4 is a diagram showing an embodiment of the router receive block 42.

As illustrated, the router receive block 42 comprises: a front router receive block 80 for receiving by trunks the packets transferred from the BTS via the respective trunks; a buffering block 85 for buffering the packets transferred in parallel from the front router receive block 80 by trunks; and a rear router receive block 90 for multiplying the trunk-based buffered packets in the unit of packet and sending the multiplied packets to the node 20.

Figure 5A:
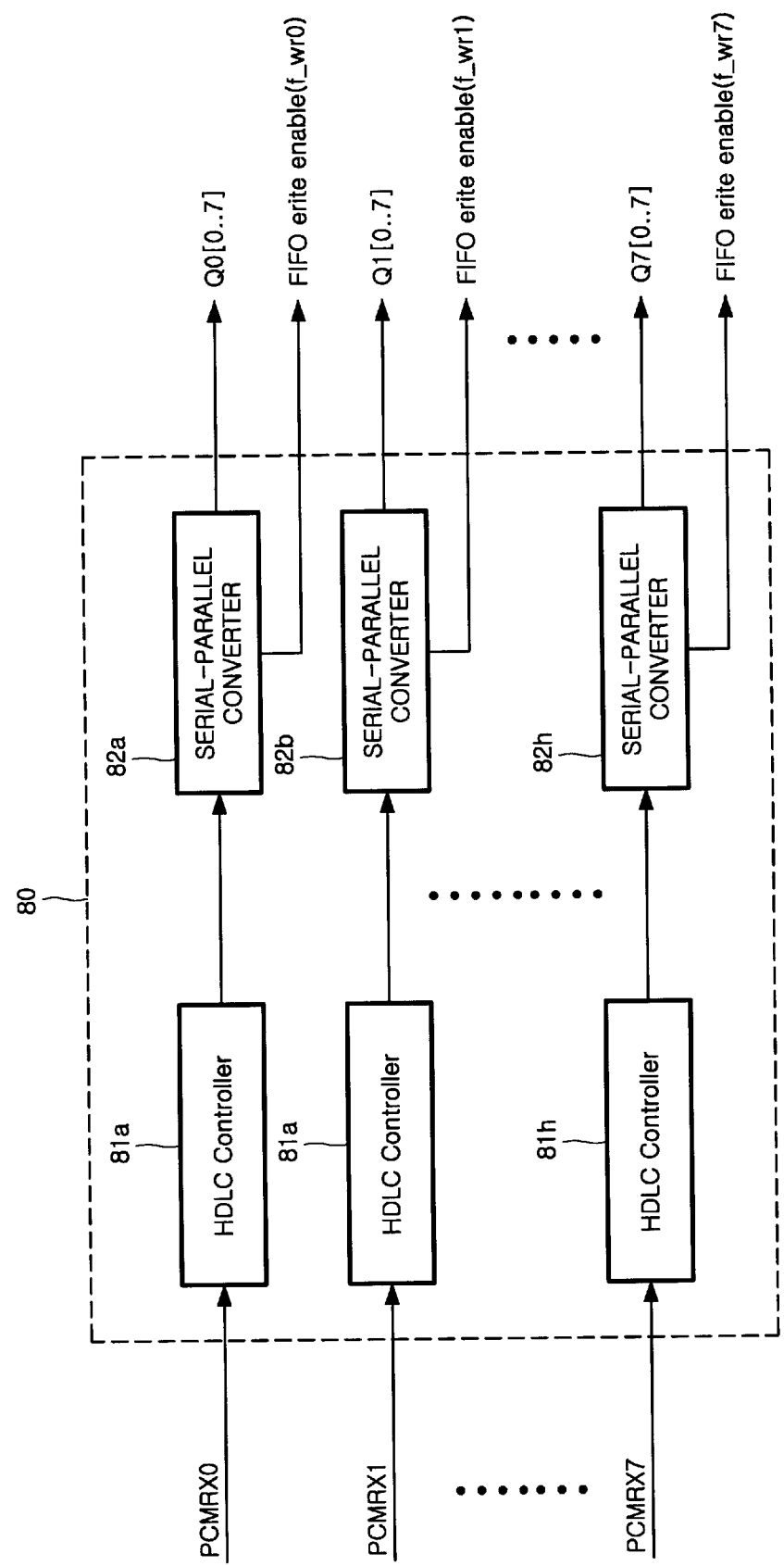
FIGS. 5a and 5b are schematic block diagrams showing an embodiment of the front router receive block and the rear router receive block shown in FIG. 4, respectively.

The front router receive block 80 comprises, as shown in FIG. 5a: a plurality of HDLC controllers 71*a*–71*h* for detecting the start and end flags of the frames received by trunks and counting the number of input packets; and a plurality of serial-parallel converters 72*a*–72*h* for converting the serial frames transferred from the HDLC controllers 71*a*–71*h* to parallel frames during a period from the start flag of the frames to the end flag.

The buffering block 85 comprises a plurality of first in first outs (FIFO's) 85*a*–85*h* for buffering the parallel data received from the serial-parallel converters 72*a*–72*h* in a first-in-first-out manner.

Figure 5B:
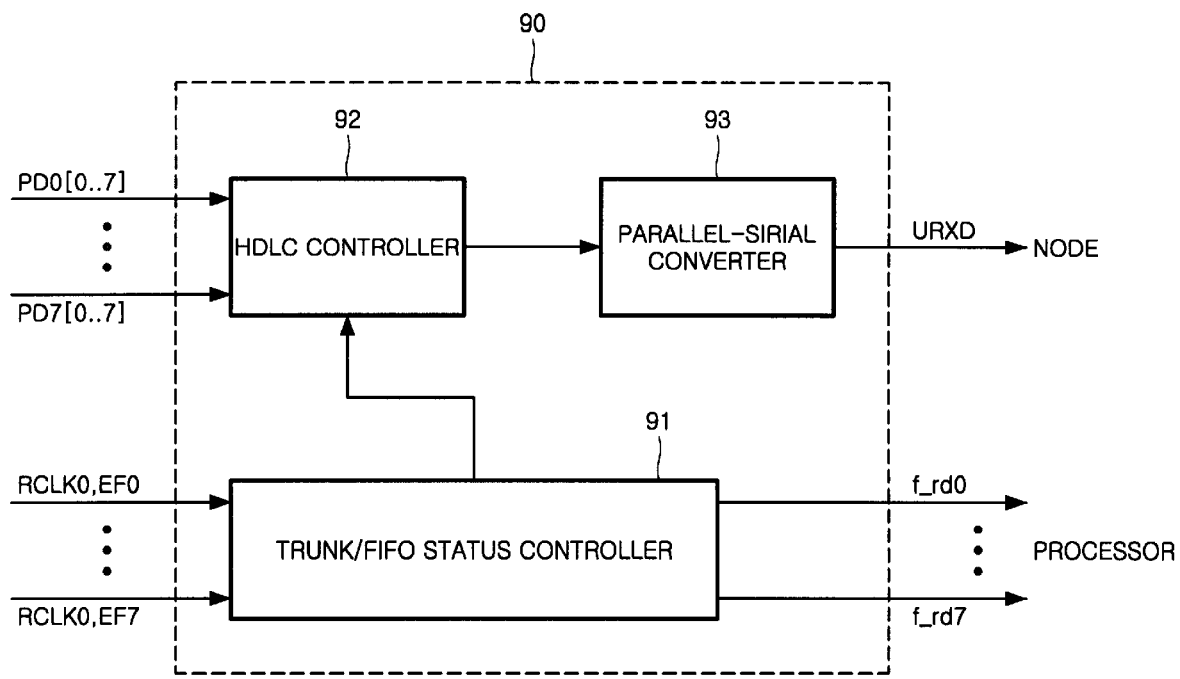

The rear router receive block 90 comprises, as shown in FIG. 5b: a trunk/FIFO status controller 91 for checking the status of all trunks and the individual FIFO's 85*a*–85*h* of the buffering block 85; a HDLC controller 92 for reading the data from the selected FIFO in the unit of byte under the control of the trunk/FIFO status controller 91 to check the start and end flags; and a parallel-serial converter 93 for converting the parallel data from the buffering block 85 to serial data until the HDLC controller 92 detects the end flag following detection of the start flag, and sending the serial data to the node 20.

Now, a description will be given to an operation of the router receive block 42 as follows.

First, the router receive block 42 stores the initial position information of the router switch (in ST21).

The router receive block 42 converts the serial packets received from the framer 51 via the respective trunks to parallel packets and stores the parallel packets in the respective FIFO's (in ST22).

Namely, the HDLC controllers 71*a*–71*h* detect the start and end flags from the packets received via the respective trunks. The individual serial-parallel converters 72*a*–72*h* convert the serial packets received from the HDLC controllers 71*a*–71*h* to parallel packets until the end flag is detected after the start flag.

FIFO write enable signals are generated to the FIFO's to store the parallel packets in the FIFO's.

Figure 6A:
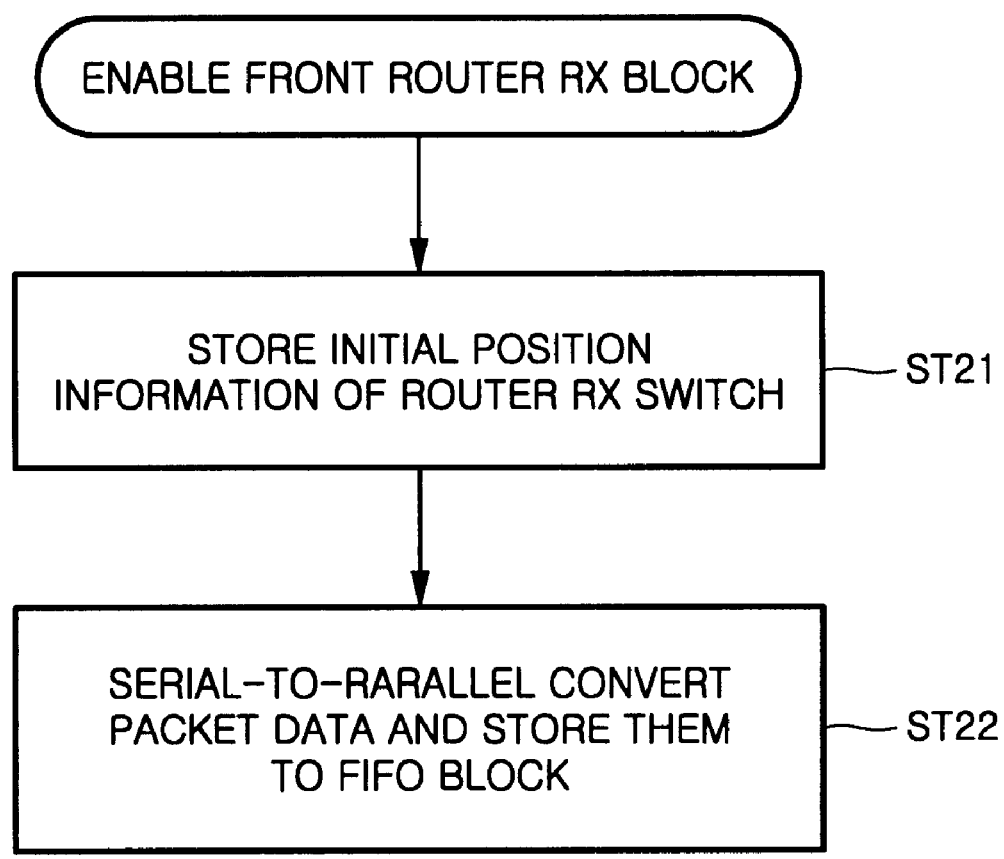
FIGS. 6a and 6b are flow charts showing a trunk routing method in sending a packet from the BTS to the BSC.
Figure 6B:
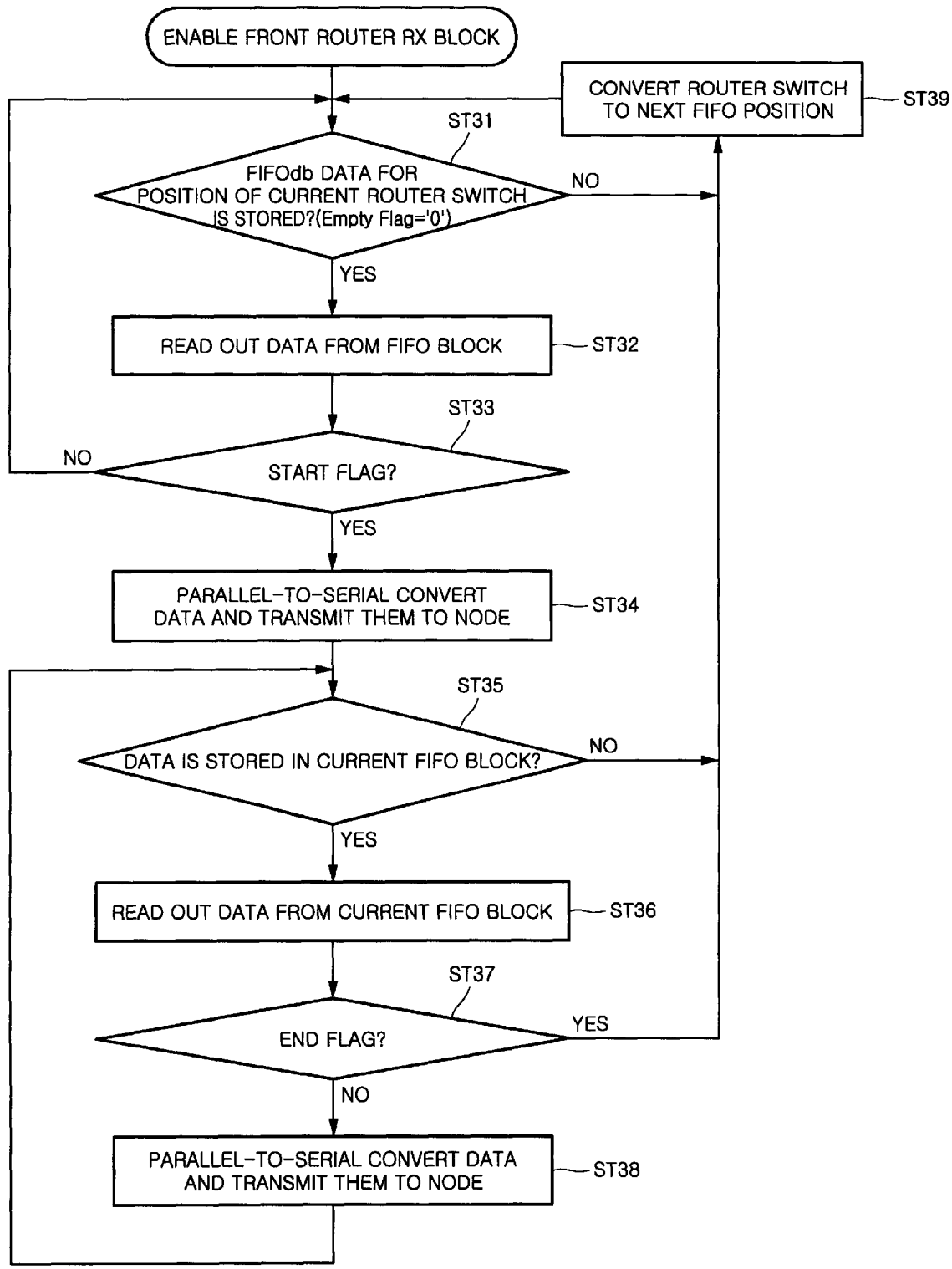

Now, a description will be given to the trunk routing method of the rear router receive block 90 with reference to FIG. 6b.

First, the rear router receive block 90 checks on whether data is stored in the FIFO at the current position of the router switch (in ST31). If no data is stored in the FIFO, the rear router receive block 90 switches the position of the router switch to the next FIFO position (in ST39); otherwise, if the data is stored in the FIFO, the rear router receive block 90 reads the data from the FIFO to detect the start flag (in ST32). Once the start flag is detected, the rear router receive block 90 converts the read data to serial data and transmits the serial data to the node (in ST33 and ST34). Then, the router receive block 90 checks on whether data is stored in the current FIFO (in ST35). If no data is stored in the current FIFO, the rear router receive block 90 reads the data from the current FIFO (in ST36) and converts the data to serial data, sending the serial data to the node until the end flag is detected, (in ST37 and ST38). Upon detection of the end flag, the rear router receive block 90 converts the position of the router switch to the next FIFO position (in ST39).

An operation of the rear router receive block 90 will be described as follows.

The trunk/FIFO status controller 91 checks the status of all trunks and FIFO's 85*a*–85*h* so that the rear router receive block 90 determines whether data is stored in the FIFO at the current position of the router switch.

If the FIFO is empty, i.e., the empty flag is "1", the rear router receive block 90 switches the position of the router switch to the next FIFO position and determines whether data is stored in the next FIFO (in ST31 and ST39).

If data is stored in the current FIFO, the rear router receive block 90 reads out the data from the FIFO (in ST31 and ST32).

Once the start flag is detected from the read data, the rear router receive block 90 converts the parallel data to serial data and transmits the serial data to the node (in ST33 and ST34).

The rear router receive block 90 determines whether data is stored in the current FIFO, (in ST35).

If the current FIFO is not empty, the rear router receive block 90 reads out the data from the FIFO and detects the end flag from the data (in ST36 and ST37).

After detection of the start flag, the rear router receive block 90 converts the data to serial data and transmits the serial data to the node until the end flag is detected, (in ST38).

Once one packet is transmitted from the current FIFO to the node 20, the rear router receive block 90 switches the position of the router switch to the next FIFO position (in ST39).

Thus the rear router receive block 90 reads the data from the FIFO's while checking the empty flag of the next FIFO, and sends the data to the node 20.

As such, the rear router receive block 90 sequentially reads out the packets from the respective FIFO's before the FIFO's become full of the packets received via the respective trunks, then sending the data to the node 20 in the unit of packet.

Ultimately, the rear router receive block 90 can transmit the data received via eight trunks to the single node 20 without any collision.

As described above, "the trunk routing device and method for the CDMA system" according to the present invention uses a trunk router for sequentially and uniformly utilizing all trunk paths with a trunk router without designating a specific trunk path for sending data between the BSC and the BTS with the trunk ID, thus increasing the utility efficiency of the trunk paths without a bias to a specific link.

The trunk router makes it possible to send a packet with one node irrespective of the number of packet transfer paths between the BSC and the BTS so that a plurality of trunks are connected to a single node, thus reducing the required number of nodes from eight to one and increasing the number of trunks on a board of the same size from eight to sixteen.

Using the trunk router for automatically assigning and establishing a trunk path for sending data between the BSC and the BTS also saves 4 bits of the trunk ID on a 3-byte address map which may otherwise be used for selecting a specific trunk path.

Furthermore, while there are some cases in the prior art that all packet data connected to the corresponding trunk line are missing due to deterioration of the trunks or during replacement of a trunk cable, the present invention uses the trunk router for sequentially switching all packet data transfer paths for all available trunks in the unit of packet, missing only one packet on the corresponding trunk path and thus without affecting transmission of the entire packet data.

What is claimed is:

1. A trunk routing device for a CDMA system, which assigns and establishes a path for sending a packet via a trunk between a base station controller and a base transceiver station, the trunk routing device comprising:

a router transmit block for storing information about trunk connection between the base station controller and the base transceiver station and information about the initial position of a current router switch, and sequentially switching packets, received from one node connected to the base station controller, to respective trunks linked to destinations of individual packets in unit of packet; and a router receive block for sequentially multiplying the packets received from the base transceiver station via the trunks and sending the multiplied packets to the node.

2. The trunk routing device as claimed in claim 1, wherein the router transmit block comprises:

an initializing block for storing information about the trunk connection between the base station controller and the base transceiver station and information about initial packet transfer path position, received from a processor of the trunk routing device;

a channel position updating block for updating the position of a channel in the unit of packet according to the trunk connection information and the initial packet transfer path position information output from the initializing block and information about base station ID detected at a router;

a switch position determiner for selecting the initial packet transfer path position information received from the initializing block and the channel position information from the channel position updating block under the control of the processor, to determine the position of the router switch;

a high-level data link control (HDLC) controller for detecting start and end of the individual packets based on packet start/end flag signal fixedly implemented with hardware; and a router for detecting the base station ID from the packets received from the node with reference to a detection signal output from the HDLC controller, and routing the packets received from the node based on the trunk connection information stored in the initializing block and the current switch position information received from the switch position determiner.

3. The trunk routing device as claimed in claim 1, wherein the router receive block comprises:

a front router receive block for receiving, by trunks, the packets from the base transceiver station via the respective trunks;

a buffering block for buffering the packets received in parallel by trunks from the front router receive block to trunk-based first-in-first-outs (FIFO's); and a rear router receive block for sequentially multiplying the packets buffered by trunks at the buffering block, in the unit of packet, and sending the multiplied packets to the node.

4. The trunk routing device as claimed in claim 3, wherein the front router receive block comprises:

a plurality of HDLC controllers for detecting start and end flags of frames received by trunks and counting number of input packets; and a plurality of serial-parallel converters for converting the serial frames received from the respective HDLC controllers to parallel frames during the start to end flags of the frames.

5. The trunk routing device as claimed in claim 3, wherein the rear router receive block comprises:

a trunk/FIFO status controller for checking and managing the status of all trunks and the respective FIFO's of the buffering block;

a HDLC controller for reading data from selected FIFO in a unit of byte under the control of the trunk/FIFO status controller, to check start and end flags of frames; and a parallel-to-serial converter for converting the parallel data received;

a parallel-to-serial converter for converting the parallel data received from the buffering block to serial data until the HDLC controller detects the end flag after detection of the start flag, and sending the serial data to the node.

6. A trunk routing method, which is to send a packet received from a base station controller to a base transceiver station via a plurality of trunks, the trunk routing method comprising the steps of:

storing information about trunk connection between the base station controller and the base transceiver station and information about the initial packet transfer path position, for initialization;

receiving a new packet from one node connected to the base station controller and detecting a destination address from the packet; and sequentially checking a plurality of trunks at a current position of a router switch, switching the position of the router switch to the next trunk connected to the detected destination address, and sending the packet to the base transceiver station via the trunk.

7. A trunk routing method, which is to send a packet received from a base transceiver station to a base station controller via a plurality of trunks, the trunk routing method comprising the steps of:

sequentially checking the status of respective FIFO's connected to respective trunks for buffering a packet received from the base transceiver station via the trunks; and sequentially reading out a packet from the respective FIFO's in the unit of packet while the respective FIFO's are empty, according to the result of the checking step, multiplying the packet and sending the multiplied packet to a node connected to the base station controller.

* * * * *